(12) United States Patent
Hoekstra et al.

(10) Patent No.: US 9,477,548 B2
(45) Date of Patent: Oct. 25, 2016

(54) ERROR REPAIR LOCATION CACHE

(71) Applicant: Freescale Semiconductor Inc., Austin, TX (US)

(72) Inventors: George P. Hoekstra, Austin, TX (US); Ravindraraj Ramaraju, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 168 days.

(21) Appl. No.: 14/450,168

(22) Filed: Aug. 1, 2014

(65) Prior Publication Data
US 2016/0034344 A1 Feb. 4, 2016

(51) Int. Cl.
*G11C 29/00* (2006.01)
*G06F 11/10* (2006.01)

(52) U.S. Cl.
CPC .................. *G06F 11/1064* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,475,194 | A | * | 10/1984 | LaVallee | G11C 29/76 365/200 |
| 5,263,032 | A | * | 11/1993 | Porter | G06F 11/106 714/710 |
| 8,650,462 | B2 | | 2/2014 | Litsyn et al. | |
| 2004/0003337 | A1 | * | 1/2004 | Cypher | G11C 29/42 714/763 |
| 2004/0218440 | A1 | * | 11/2004 | Kumar | G11C 29/16 365/202 |
| 2009/0055680 | A1 | * | 2/2009 | Honda | G06F 11/1068 714/5.1 |
| 2010/0095149 | A1 | * | 4/2010 | Lee | G11C 29/765 714/6.13 |
| 2010/0241932 | A1 | * | 9/2010 | Sakaue | G06F 11/1016 714/784 |
| 2012/0124294 | A1 | * | 5/2012 | Atkisson | G06F 11/108 711/135 |
| 2015/0154111 | A1 | * | 6/2015 | D'Abreu | G06F 3/06 714/6.11 |
| 2015/0255176 | A1 | * | 9/2015 | Hyder | G11C 29/4401 714/723 |

OTHER PUBLICATIONS

John Wuu et al, "The Asynchronous 24MB On-chip Level-3 Cache for a Dual-Core Itanium-Family Processor," IEEE International Solid-State Circuits Conference, 2005, Session 26.8, pp. 488-489, 618; 3 pages.
Yu Cai et al, "Error Patterns in MLC NAND Flash Memory: Measurement, Characterization, and Analysis," European Design Automation Association, 2012, pp. 521-526; 6 pages.

* cited by examiner

*Primary Examiner* — Guerrier Merant

(57) ABSTRACT

A method for repairing a memory includes executing an Error Correction Code (ECC) for a page of the memory. The page includes a plurality of bits having an inherent number of failed bits equal to or greater than zero. The ECC is configured to correct a correctable number of failed bits from the plurality of bits. A location of a failure prone bit in the page is determined from a cache in response to the correctable number of failed bits being less than the inherent number of failed bits. A state of the failure prone bit is changed to a new state in response to determining the location of the failure prone bit. The ECC is executed in response to the state of the failure prone bit being changed to the new state.

16 Claims, 5 Drawing Sheets

US 9,477,548 B2

ERROR REPAIR LOCATION CACHE

FIELD

This disclosure relates generally to error correction, and more specifically to improving the capability of Error Correction Code for correcting errors in a memory.

BACKGROUND

Large capacity memory systems commonly employ error correction techniques to improve the yield and reliability of the multitude of memory bits in a memory. One technique for error correction includes the use of Error Correction Code (ECC), which uses addition memory bits to represent an attribute of a memory word that the additional bits are associated with. For example, the additional bits could represent the parity of a word or even replicate the entire word itself. A variety of ECC methodologies exist to strike a balance between the physical overhead associated with additional memory bits, the impact on READ latency required to evaluate whether a memory word has a failure and the efficacy of the ECC to correct the memory word it is associated with.

With geometric scaling of memories and the increased use of multi-level bit (MLB) storage to represent more than one logical state per bit, memories must rely on the detection of fewer electrons to detect a stored memory state. With increased demands for wider operating temperature range memory reliability is further challenged. In particular with NAND Flash non-volatile memories, an increase in the required Program/Erase cycles further limits the reliability of advanced memory systems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As memory signal margins decrease with geometric scaling of memory and the use of MLB storage, the compensatory use of ECC undesirably increases memory area and system latency, in particular READ latency. Memory errors are often not random and in many cases are caused by physical coupling issues or defects. In one example, a coupling issue exists between a bit line and a noisy conductor (e.g. a noisy ground conductor for example). The noisy conductor offsets the signal that the bit line carries between a bit cell and a sense amplifier, thereby causing a READ failure. In another example, a manufacturing defect reducing a dielectric spacing between conductors, thereby increasing the coupling between the conductors beyond design limits. In another example, bit cells on the edges of a memory array are prone to failure due to process micro-loading effects caused by etching.

Advantageously, embodiments of systems and methods described herein detect error prone locations and extend the efficacy of ECC by flipping the state of a failure prone bit when the number of detected bit errors exceeds the capability of the ECC (e.g. when the ECC "saturates"). Principally, an aspect of the disclosed concept stores failure locations of previously failed bits that were corrected by ECC and establishes a metric (e.g. a "location ratio") that defines the previously failed location that is most likely to reoccur. When a subsequent execution of ECC saturates (because the number of failed bits exceeds the capability of the ECC as implemented), a mechanism is provided to flip the failed bit with the highest location ratio, and the ECC is executed once again. This increases the probability of a successful ECC execution and improves the yield and reliability (amongst other advantages) without resorting to increasing memory area or latency with more complicated ECC schemes. The failure data collected also provides valuable guidance for manufacturing process monitoring, yield enhancement and optimization of wear leveling.

Figure 1:
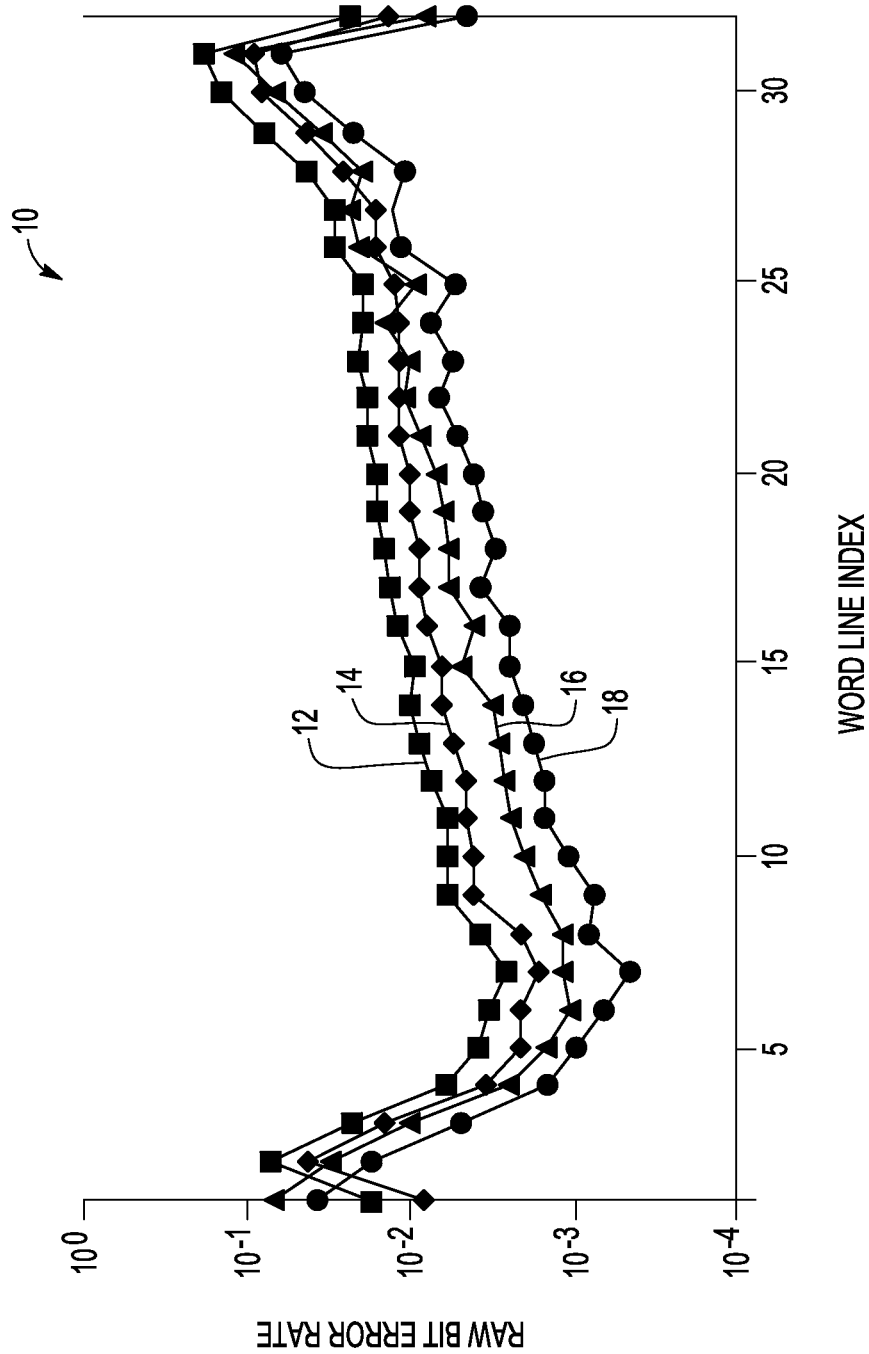
FIG. 1 is graphical view of a bit error rate for bits distributed across a word line.

FIG. 1 shows a graph 10 of a Raw Bit Error Rate, (prior to ECC correction) for two blocks of series connected cells located along 32 adjacent word lines. The graph 10 shows one example of an error trend that is not random. The Word Line Index spans from 0 to 31, corresponding to the 32 physical locations within a block. There are blocks of 32 cells shown where each bit cell stores two bits worth of data in each bit cell location. The odd blocks 12, 14, and the even blocks 16 and 18 are shown with a peak in the error rate near the extremities of the block of cells attached to the word line (e.g. near index 1 and index 30). These peaks also correlate to fail prone locations that will be determined by successful ECC execution and stored in the event that a future ECC execution saturates.

Figure 2:
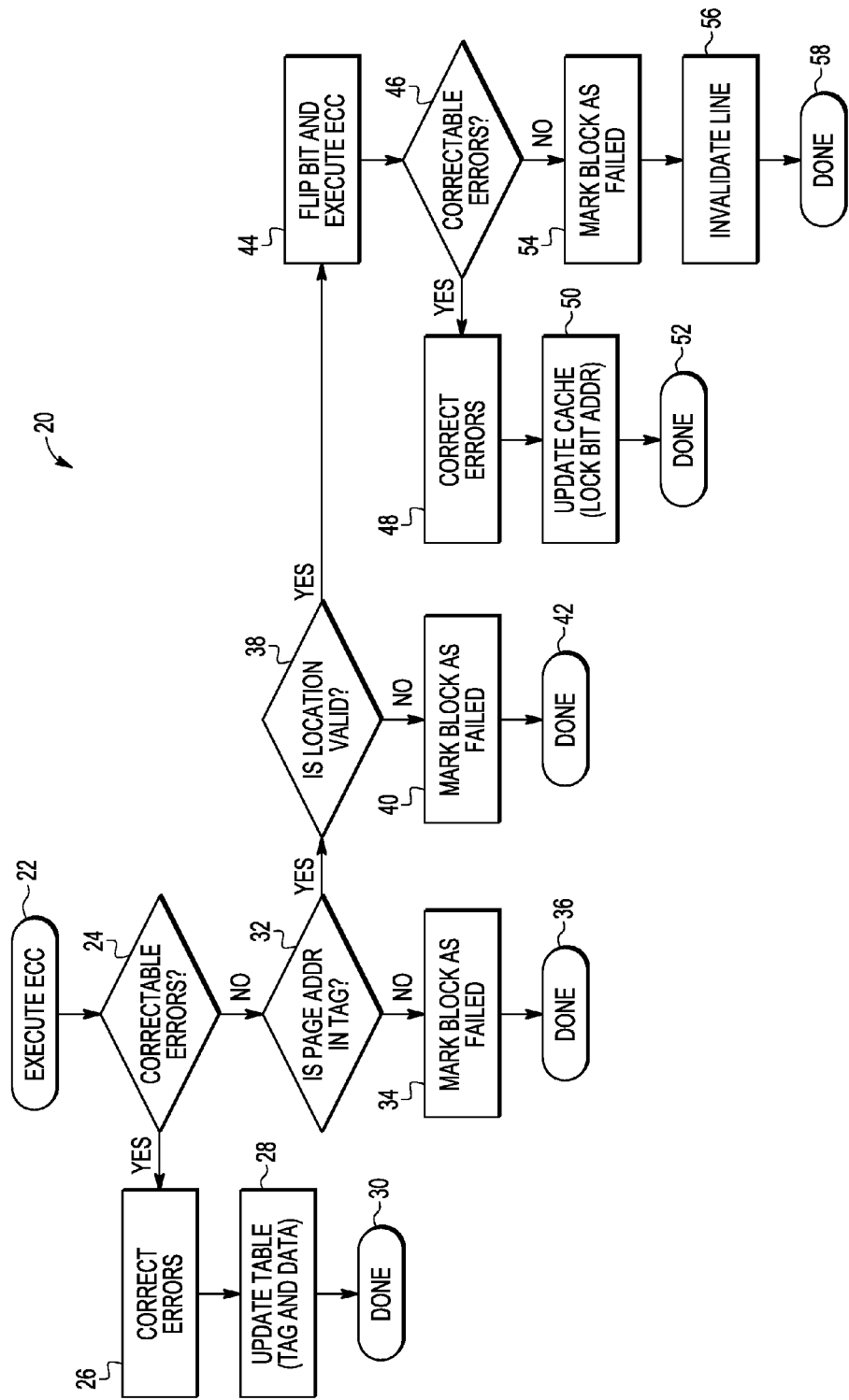
FIG. 2 is a flowchart representation of a method of repairing errors with an error repair location cache.

FIG. 2 is a flowchart 20 of a method of repairing memory errors according to one embodiment of the present disclosure. An inherent number of failed bits exist in a memory, some or all of which can be corrected by executing the ECC. The term "inherent number of failed bits" means the number of failed bits determined when reading the memory prior to executing ECC. Failed bits can result from manufacturing defects or soft errors for example. In some embodiments, the inherent number of failed bits is zero. At step 22 an ECC is executed. In one embodiment, the ECC uses a Hamming code implemented with additional memory bits and is applied to a page of a memory. A page is a group of consecutive memory bits. There are multiple pages in a block, with each page having its own memory bits to implement the ECC. A block is a larger group of memory bits, typically erased concurrently. Memory arrays typically have multiple blocks.

At step 24, if the ECC is able to correct all of the detected failed bits (e.g. "errors"), the errors are then corrected at step 26. After correcting the errors at step 26, an error repair location cache (e.g. "cache") is updated at step 28. Specifically, a page address of the page with the failed bit, the location of the corrected (e.g. "repaired") bit, which had previously failed, and the failed state is stored. A valid bit is also set to indicate the newly stored location data is valid. After the cache is updated at step 28, a step 30 indicates that the error repair sequence is done. In one embodiment, a flag is set at step 30 to inform a controller to return to an idle state awaiting the next request to execute the ECC. In another embodiment, step 30 informs a user of a system that step 28 has been completed.

If it is determined at step 24, that the ECC is unable to correct all of the detected failed bits, then step 32 determines if the address of the page (e.g. "Page Addr"), for which ECC is being performed, is in the cache Tag. Specifically, the page address is matched against one or more tags in a cache to determine an address match. In one embodiment, a block address is also used to index or select at least one cache set corresponding to the block. The cache set has at least one tag with a page address and at least one cache data with a failure bit location.

If the page address is not matched to a tag in the cache then the block that includes the respective page is marked as "Failed" at step 34. Similar to step 30, the error repair sequence terminates at step 36. A failed block contains a page that is neither correctable by the ECC designed into the page or by subsequently executing ECC with a previously failed bit flipped. Thus, the failed block is generally an indication of a failure mechanism that affects many bits (e.g. a large cluster defect).

If the page address is matched to a tag at step 32, then a valid bit associated with the matched tag is verified as valid. A valid bit ensures that the matched tag is a result of a tag being validly written to the cache and not a coincidental match from random data or from previous unrelated operations. If the valid bit is not valid, then the block is marked as Failed at step 40 and subsequently the error repair sequence terminates at step 42, similar to step 30. If the valid bit is valid, then step 44 is executed.

At step 44 a previously failed bit, whose location is both valid and is from the same page that failed, is flipped (e.g. the state of the bit is changed from a logical '0' to a logical "1", or from a logical "1" to a logical "0") and the ECC is executed with the flipped bit. In some embodiments, the error repair location cache is fully associative and only contains one location for each tag matching the page address at step 32. In other embodiments, the error repair location cache is a multi-way set associative cache (e.g. 2-way or 4-way). Embodiments that use a multi-way set associative cache may store multiple failed locations with the same tag value (e.g. same page in the same block) and use a metric called a "location ratio" to define which of the multiple failed locations should be chosen to be flipped.

For embodiments with a multi-way set associative cache, in addition to storing a block address as an index to select cache sets, the page address in a tag, failed location, the failed state and a valid bit, the cache also stores a location error count and a page access count. The location error count defines the number of times the ECC has corrected the same memory state at the same failed bit location. The page access count defines the number of times a page has been accessed. A location ratio is defined by the ratio of the location error count divided by the page access count. A high number for a location ratio indicates a failed memory bit that is more prone to failure than a failed memory bit with a low number for a location ratio.

If more errors occur in a page than there are ways in the cache, the "cache line" with the lowest location ratio is evicted and freed to store information related to the new error. Specifically, the valid bit is reset to false so that the tag, the failed location, the location error count, the page access count, and the failed state can be overwritten. In another embodiment, a lock bit is also stored in the cache line. The lock bit associated with a failed bit is set to true when, after executing the ECC with the failed bit flipped, the memory errors in the page are successfully corrected. In embodiments comprising a lock bit, the cache line will not be evicted if the lock bit is set to true, even if the cache line has the lowest location ratio.

After executing the ECC with the failed bit flipped at step 44, step 46 subsequently determines if the memory errors are correctable. If the errors were correctable then the errors are corrected at step 48. Following error correction at step 48, the cache is updated at step 50 by setting the lock bit, associated with the flipped bit, to true (e.g. the lock bit is in the same cache line as the location of the failed bit that was flipped). Subsequently and similarly to step 30, the error repair sequence terminates at step 50.

If at step 46 it is determined that the memory errors are not correctable, then at step 54 the block is marked as failed. At step 56 the cache line is then invalidated by setting the valid bit to false, thereby freeing the cache line to be written with data from subsequent memory bit failures. Similar to step 30, the error repair sequence terminates at step 58.

In one embodiment at step 44, the ECC is executed after the failure prone bit (e.g. the bit with the highest location ratio) is flipped. In another embodiment, a second ECC is executed with the failure prone bit flipped (similar to step 44) substantially in parallel with executing the ECC of step 22. A parallel pass execution of the ECC improves system latency by reducing the time required to correct memory errors at the expense of duplicating the area required to evaluate the ECC.

Figure 3:
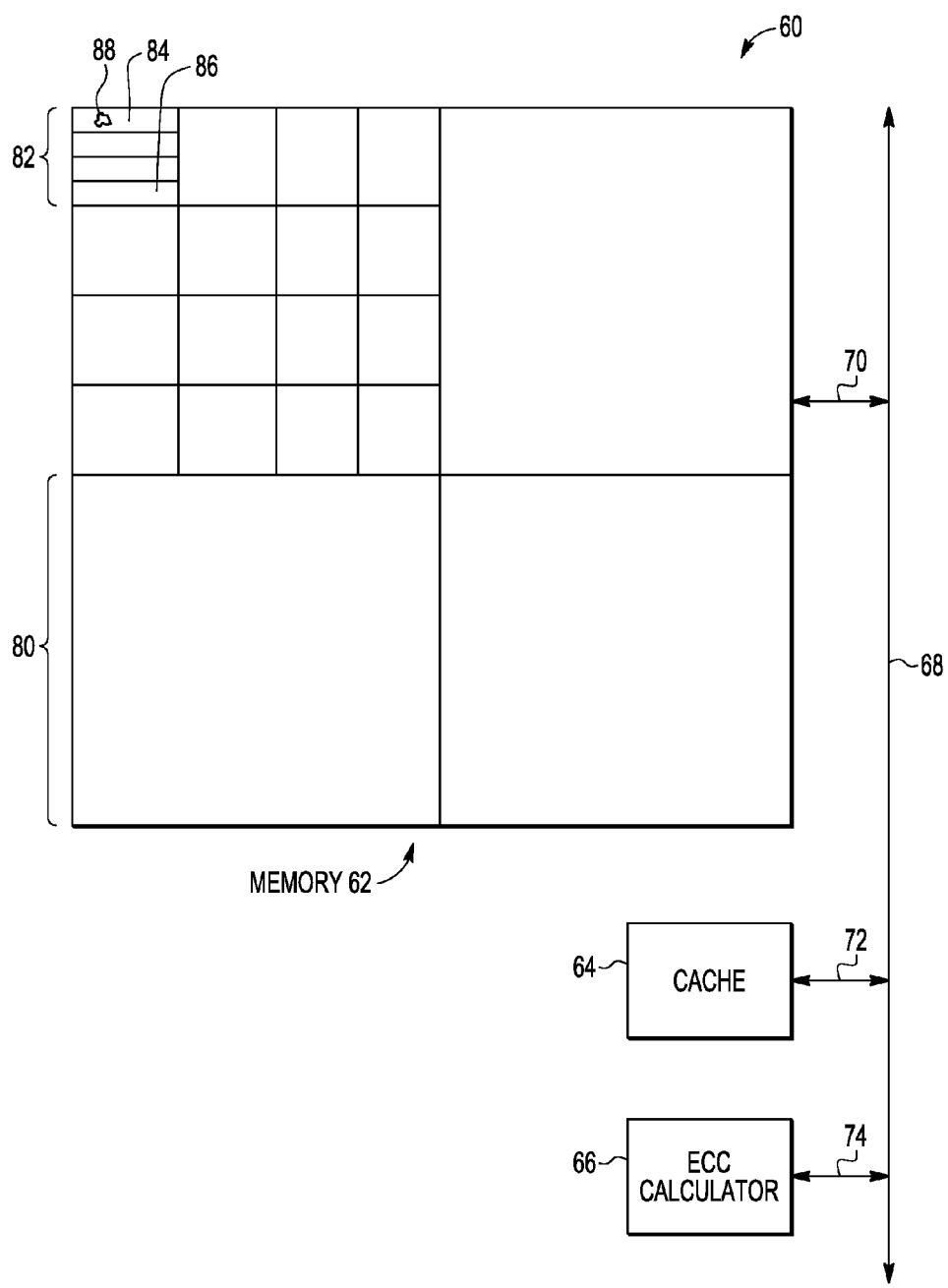
FIG. 3 is a schematic view of a system for repairing errors with an error repair location cache.

FIG. 3 shows a system 60 for repairing errors with an error repair location cache. The system includes a Memory 62, a cache 64 and an ECC Calculator 66. In one embodiment, the Memory is a NAND Flash, however other large capacity memories are envisioned with the scope of this disclosure, whether volatile or non-volatile. For example, the concepts disclosed herein are also applicable to DRAM, MRAM or PRAM memories or other memory types that are prone to non-random errors. In one embodiment, the Cache 64 is a 2-way set associate cache, although fully associative, 4-way or other multi-way caches are envisioned to take advantage of the disclosed concepts. In one embodiment, the ECC Calculator 66 is implemented with a combination of logic gates. The Memory 62 communicates with a bus 68 through a connection 70. The Cache 64 communicates with the bus 68 through a connection 72. The ECC Calculator 66 communicates with the bus 68 through a connection 74.

The Memory 62 includes a plurality of Blocks 80 defining a group of memory bits that are concurrently erasable through a shared substrate (e.g. "bulk") connection. Each Block 80 is further partitioned into a plurality of Pages 82. Each Page 82 has a plurality of memory words 84 that share a group of ECC bits 86 that encode at least a portion of the information contained within the page. In some embodiments, a cluster defect 88 affects a memory word 84 and thereby results in non-random failure of memory bits that may be corrected by the concepts disclosed herein.

Figure 4:
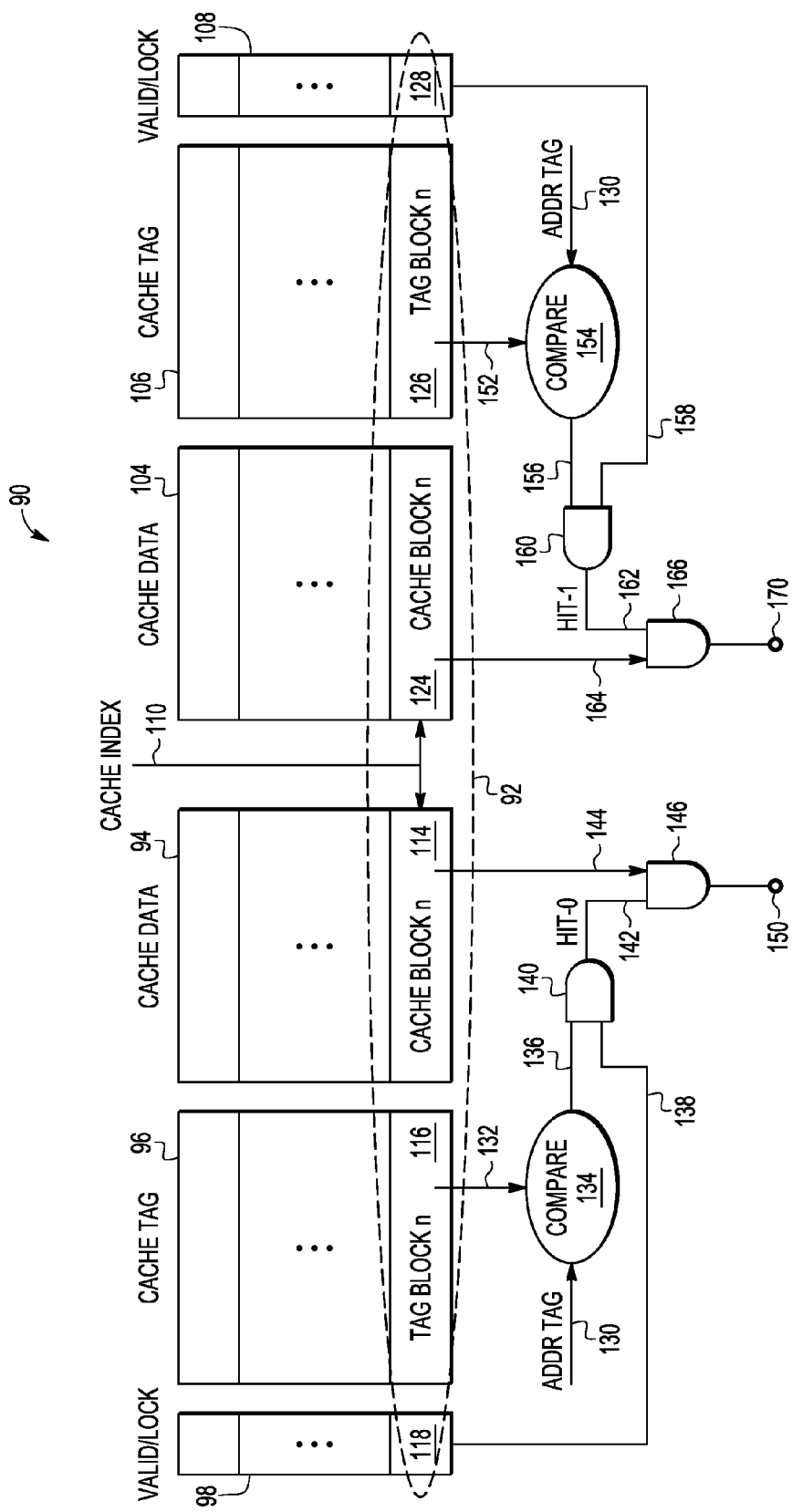
FIG. 4 is a schematic view of a two-way set-associative cache according to the present disclosure.

FIG. 4 shows a 2-way set associative cache 90 according to an embodiment of the present disclosure. The cache 90 includes at least one Cache Set 92 including two "ways." One way of a set includes one entry from a Cache Data 94, a respective entry from a Cache Tag 96 and respective pair of Valid/Lock bits 98. A second way of the set includes one entry from a Cache Data 104, a respective entry from a Cache Tag 106 and respective pair of Valid/Lock bits 108. A Cache Index 110 selects one of the sets corresponding to one of the blocks 80 from FIG. 3. The Cache Data 94 and 104 each hold data related to a respective failed bit, including but not limited to failure location and failure state. The Cache Tag 96 and 106 hold a corresponding page address (e.g. Page 82 from FIG. 3) within which the failed bit resides. The pair of Valid/Lock bits 98 and 108 are used to indicate whether the data in the Cache Data 94 and 104 are valid, and whether they are locked as a result of the data successfully correcting a saturated ECC condition.

In one example of the operation of the 2-way set associative cache 90, the Cache Index 110 selects a Cache Set 92 corresponding to Block n (where "n" is one of the blocks from the Memory 62 of FIG. 3). The Cache Set 92 includes a Cache Block n 114, a Tag Block n 116 and a pair of Valid/Lock bits 118 for one way, and a Cache Block n 124, a Tag Block n 126 and a pair of Valid/Lock bits 128 for the second way. An address tag (Addr Tag) 130 is compared with the output 132 of Tag block n 116 with a comparator 134. If both the comparator output 136 and a corresponding valid bit 138 from the Valid/Lock bit pair 98 are true (e.g. both have a logical "1" state or high state) then an AND-gate 140 provides a Hit-0 142 being true. If Hit-0 142 is true, then the data 144 from the Cache Block n 114 is combined with an AND-gate 146 to produce a first way output 150.

Similarly, an address tag (Addr Tag) 130 is compared with the output 152 of Tag block n 126 with a comparator 154. If both the comparator output 156 and a corresponding valid bit 158 from the Valid/Lock bit pair 108 are true (e.g. both have a logical "1" state or high state) then an AND-gate 160 provides a Hit-1 162 being true. If Hit-0 162 is true, then the data 164 from the Cache Block n 124 is combined with an AND-gate 166 to produce a second way output 170. The first way output 150 and the second way output 170 provide data related to two failed bits within a page 82 that are used to extend the capability of the ECC bits 86.

Figure 5:
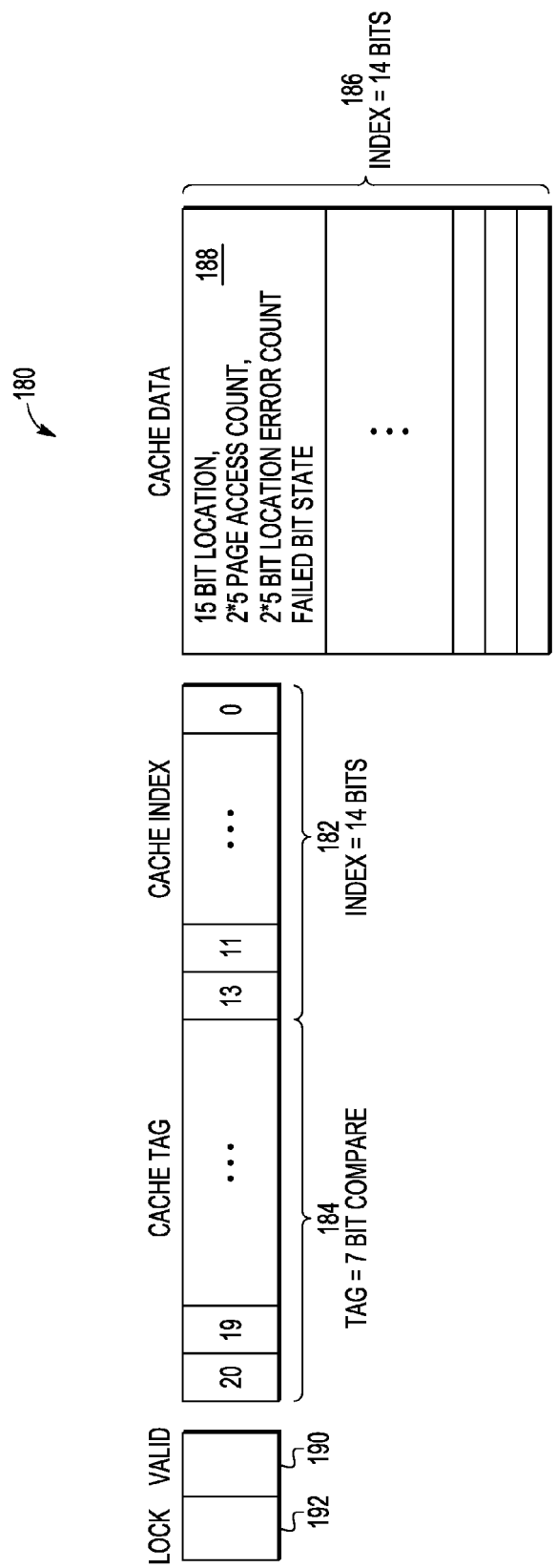
FIG. 5 is a schematic view of one way of a cache set.

FIG. 5 shows an addressing scheme 180 for one way of the cache set 90. The scheme 180 includes a Cache Index 182, a Cache Tag 184, a Cache Data 186 with a region 188 corresponding to one set, a Valid bit 190 and a Lock bit 192. With reference to FIG. 3 and FIG. 5, one example embodiment includes 16K Blocks, each Block being similar to Block 80 and addressed by 14 bits. Each Block 80 has 128 Pages 82 addressed by 7 bits. Each Page 82 includes 4K bytes addressed by 12 bits. Each byte is addressed by 3 bits. With reference to FIG. 5, the Cache Index 182 is used to select one of 16K blocks and thus has 14 bits. Similarly, one region 188 in the Cache Data 186 corresponding to one of 16K blocks, requires 14 bits to be uniquely addressed. The Cache Tag 184 includes bits 14 through 20 (e.g. 7 bits corresponding to 128 pages per block). The Valid bit 190 and the Lock bit 192 are each single bits. In one embodiment, each region 188 of the Cache Data 186 includes 15 bits to identify a failed bit location (e.g. 4K bytes/page addressed with 12 bits, and 3 bits/byte). The region 188 also includes 5 bits for the page access count, 5 bits for the location error count and a single bit for the failed bit state. It is envisioned within the scope of this disclosure that different block and page sizes are realizable as are different limits for the location, page access count and location error count.

As will be appreciated, embodiments as disclosed include at least the following. In one embodiment, a method for repairing a memory comprises executing an Error Correction Code (ECC) for a page of the memory. The page comprises a plurality of bits having an inherent number of failed bits equal to or greater than zero. The ECC is configured to correct a correctable number of failed bits from the plurality of bits. A location of a failure prone bit in the page is determined from a cache, in response to the correctable number of failed bits being less than the inherent number of failed bits. A state of the failure prone bit is changed to a new state, in response to determining the location of the failure prone bit. The ECC is executed in response to the state of the failure prone bit being changed to the new state.

Alternative embodiments of the method for repairing a memory comprise executing the ECC with the failure prone bit not changed to the new state, substantially in parallel with executing a second ECC with the failure prone bit changed to the new state. The location of the failure prone bit is stored in the cache in response to executing the ECC and the correctable number of failed bits is greater than or equal to the inherent number of failed bits. The location of the failure prone bit determined from the cache further comprises matching a page address to one of a plurality of cache tags stored in the cache. Each cache tag is linked to a cache data including the location of a respective failure bit, and at least one respective failure bit is the failure prone bit. A status of a block including the page is set to failed when the page address is not matched to any one of the plurality of cache tags stored in the cache. A respective valid bit of a cache tag is verified as true in response to matching the page address to one of the plurality of cache tags. The status of the block including the page is set to failed when the respective valid bit is false. A lock bit is set to true if the correctable number of failed bits is greater than or equal to the inherent number of failed bits after executing the ECC with the state of the failure prone bit changed to the new state. The status of a block including the page is set to failed if the correctable number of failed bits is less than the inherent number of failed bits after executing the ECC with the state of the failure prone bit changed to the new state. The respective valid bit of the one of the plurality of cache tags matching the page address is set to false in response to the status of the block being set to failed.

In another embodiment, a method for determining a failure prone bit in a memory comprises storing in a storage unit at least one location of a respective failed bit of a plurality of bits in a page, and for each location, a page access count, a location error count and a failed bit state. The page access count is incremented for each access to the page. The location error count is incremented for each occurrence of the respective failed bit being corrected by executing an Error Correction Code (ECC). A location ration is calculated for each respective failed bit by dividing the location error count by the page access count. The failure prone bit is determined as being the respective failed bit with the highest location ratio.

Alternative embodiments of the method for determining a failure prone bit comprise setting a respective valid bit to a true value in response to storing each location, and further determining the failure prone bit with the respective valid bit being true. A lock bit for a respective failed bit is set to a true value in response to changing the state of the respective failed bit, and correcting a remainder of the failed bits by executing the ECC. Storing in a storage unit comprises storing in a cache. A location having the lowest location ratio of the at least one location is replaced with a replacement location.

In another embodiment, a system for repairing memory errors comprises a memory having a plurality of blocks. Each block has a plurality of pages including at least one failed bit. A cache is configured to store a location of a failed bit from the at least one failed bit and at least one accumulated value associated with the location of the failed bit. An Error Correction Code (ECC) calculator block is configured to repair the failed bit located at the location.

Alternative embodiments of the system for repairing memory errors are realized wherein the cache comprises a one or more cache sets. Each cache set is selectable by a cache index including a respective block address of the block comprising the page having the location of the failed bit. Each cache set comprises at least one cache tag and a respective cache data. Each cache tag comprises a respective page address of the page in the block addressed by the respective block address. Each cache data comprises the location of the failed bit, the page access count and the location error count. The cache is a two way set associative cache wherein the cache data is a first cache data and the cache includes a second cache data. The at least one accumulated value includes a page access count and a location error count. The page access count is incremented for each access to the page including the location. The location error count is incremented for each repair of the failed bit stored at the location. The memory is a NAND FLASH memory.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for repairing a memory comprising:
   executing an Error Correction Code (ECC) for a page of the memory, the page comprising a plurality of bits having an inherent number of failed bits equal to or greater than zero, the ECC configured to correct a correctable number of failed bits from the plurality of bits;
   determining from a cache, a location of a failure prone bit in the page, in response to the correctable number of failed bits being less than the inherent number of failed bits wherein said determining comprises matching a page address to one of a plurality of cache tags stored in the cache, each cache tag linked to a cache data including the location of a respective failure bit, at least one respective failure bit being the failure prone bit;
   changing a state of the failure prone bit to a new state, in response to determining the location of the failure prone bit;
   executing the ECC in response to the state of the failure prone bit being changed to the new state; and
   verifying a respective valid bit of a cache tag is true in response to matching the page address to one of the plurality of cache tags.

2. A method for repairing a memory comprising:
   executing an Error Correction Code (ECC) for a page of the memory, the page comprising a plurality of bits having an inherent number of failed bits equal to or greater than zero, the ECC configured to correct a correctable number of failed bits from the plurality of bits;
   determining from a cache, a location of a failure prone bit in the page, in response to the correctable number of failed bits being less than the inherent number of failed bits;
   changing a state of the failure prone bit to a new state, in response to determining the location of the failure prone bit;
   executing the ECC in response to the state of the failure prone bit being changed to the new state; and
   executing the ECC with the failure prone bit not changed to the new state, substantially in parallel with executing a second ECC with the failure prone bit changed to the new state.

3. The method of claim 1 wherein the location of the failure prone bit is stored in the cache in response to executing the ECC and the correctable number of failed bits being greater than or equal to the inherent number of failed bits.

4. The method of claim 1 wherein a status of a block including the page is set to failed when the page address is not matched to any one of the plurality of cache tags stored in the cache.

5. The method of claim 1 wherein the status of the block including the page is set to failed when the respective valid bit is false.

6. The method of claim 1 wherein a lock bit is set to true if the correctable number of failed bits is greater than or equal to the inherent number of failed bits after executing the ECC with the state of the failure prone bit changed to the new state.

7. The method of claim 1 wherein the status of a block including the page is set to failed if the correctable number of failed bits is less than the inherent number of failed bits after executing the ECC with the state of the failure prone bit changed to the new state.

8. A method for determining a failure prone bit in a memory comprising:
   storing in a storage unit at least one location of a respective failed bit of a plurality of bits in a page, and for each location, a page access count, a location error count and a failed bit state;
   incrementing the page access count for each access to the page;
   incrementing the location error count for each occurrence of the respective failed bit being corrected by executing an Error Correction Code (ECC);
   calculating a location ratio for each respective failed bit by dividing the location error count by the page access count; and
   determining the failure prone bit being the respective failed bit with the highest location ratio.

9. The method of claim 8 further comprising setting a respective valid bit to a true value in response to storing each location, and further determining the failure prone bit with the respective valid bit being true.

10. The method of claim 8 further comprising setting a lock bit for a respective failed bit to a true value in response to changing the state of the respective failed bit, and correcting a remainder of the failed bits by executing the ECC.

11. The method of claim 8 wherein storing in a storage unit comprises storing in a cache.

12. The method of claim 11 further comprising replacing a location having the lowest location ratio of the at least one location with a replacement location.

13. A system for repairing memory errors comprising:
a memory having a plurality of blocks, each block having a plurality of pages including at least one failed bit;
a cache configured to store a location of a failed bit from the at least one failed bit and at least one accumulated value associated with the location of the failed bit, wherein the cache comprises
a one or more cache sets, each cache set selectable by a cache index including a respective block address of the block comprising the page having the location of the failed bit, each cache set comprising at least one cache tag and a respective cache data;
each cache tag comprising a respective page address of the page in the block addressed by the respective block address, and
each cache data comprising the location of the failed bit, a page access count, and a location error count; and
an Error Correction Code (ECC) calculator block configured to repair the failed bit located at the location.

14. The system of claim 13 wherein the cache is a two way set associative cache wherein the cache data is a first cache data and the cache includes a second cache data.

15. The system of claim 13 wherein the at least one accumulated value includes the page access count and the location error count, the page access count incremented for each access to the page including the location, and the location error count incremented for each repair of the failed bit stored at the location.

16. The system of claim 13 wherein the memory is a NAND FLASH memory.

\* \* \* \* \*